United States Patent [19]

McFall

[11] Patent Number: 5,839,565
[45] Date of Patent: Nov. 24, 1998

[54] BELT TRIPPER SYSTEM FOR USE WITH AN ENDLESS CONVEYOR BELT AND RELATED IMPROVEMENTS

[76] Inventor: Robert M. McFall, P.O. Box 1282, Clintwood, Va. 24228

[21] Appl. No.: 744,591

[22] Filed: Nov. 6, 1996

[51] Int. Cl.⁶ .................................................. B65G 47/46
[52] U.S. Cl. .......................................... 198/364; 414/397
[58] Field of Search .................................... 198/361, 364, 198/831, 631.1; 414/397, 398

[56] References Cited

U.S. PATENT DOCUMENTS

| | | | |
|---|---|---|---|
| 1,818,427 | 8/1931 | Paisley | 198/364 |
| 4,024,949 | 5/1977 | Kleysteuber et al. | 198/831 |
| 4,067,439 | 1/1978 | Janitsch | 198/831 X |
| 4,988,253 | 1/1991 | McFall | 198/831 X |
| 5,098,248 | 3/1992 | McFall | 414/397 |
| 5,197,845 | 3/1993 | Sneed | 414/398 X |

FOREIGN PATENT DOCUMENTS 270008  5/1927  United Kingdom.

OTHER PUBLICATIONS

Long–Airdox Co., Sales Bulletin #1307, Oak Hill, W. Va., 1990.

Lewin Fordertechnologie, Advertisement, undated.

*Primary Examiner*—James R. Bidwell
*Attorney, Agent, or Firm*—Michael E. McKee

[57] ABSTRACT

An improved belt tripper system for discharging particulate material from the upper run of an endless conveyor belt includes a belt tripper having a frame which is supported upon a pair of parallel guide rails and which is adapted to be guided along the guide rails in the event that the guide rails have a curved section along the length thereof. The frame may be segmented or wheeled, and the endless conveyor belt, which may be a track-following belt, is comprised substantially of elastomeric material and is adapted to flex laterally to accommodate the movement of the belt through a curve. In addition, guide rollers may be disposed at selected locations along the upper belt run to aid the maneuvering of the upper belt run through a curve.

40 Claims, 5 Drawing Sheets

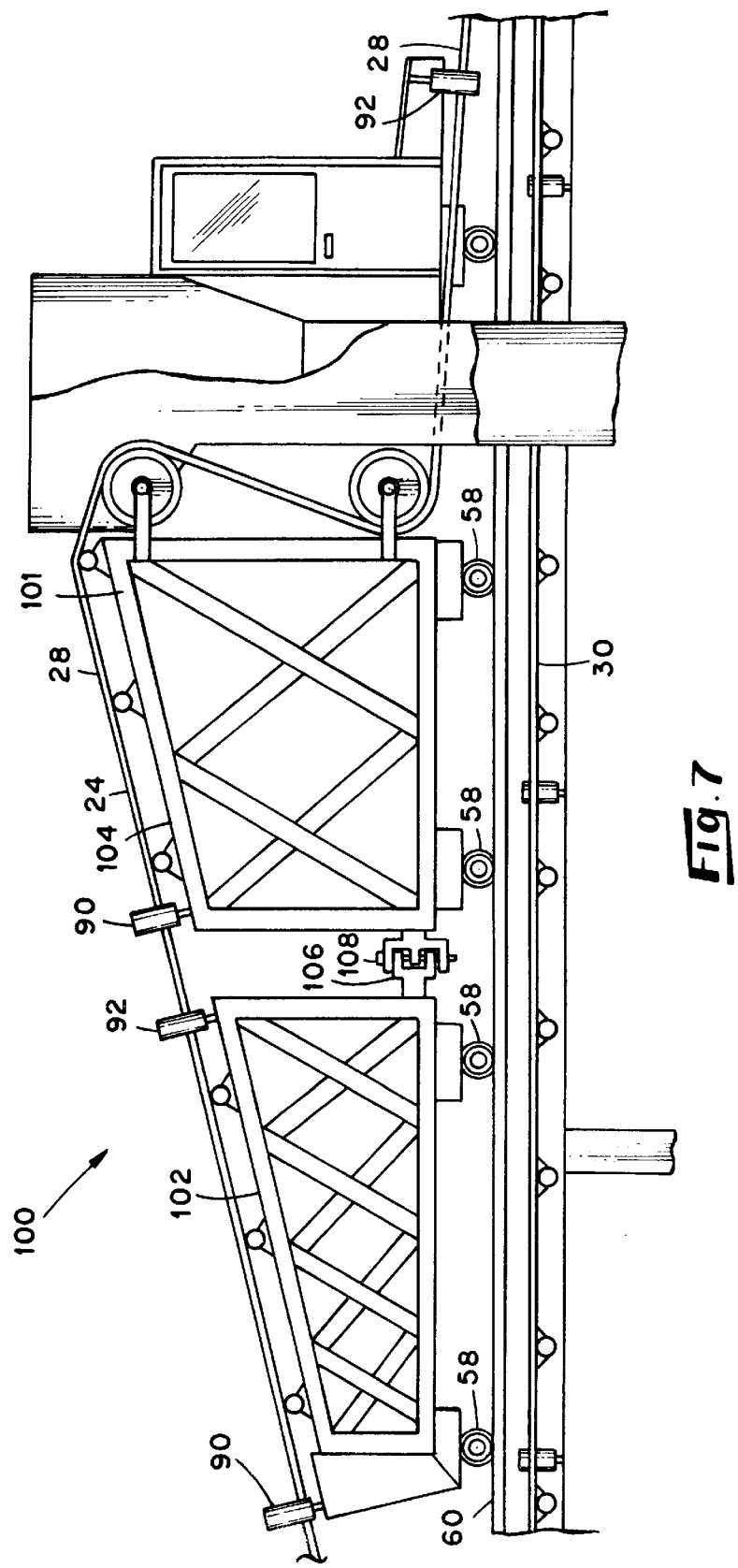

5,839,565

BELT TRIPPER SYSTEM FOR USE WITH AN ENDLESS CONVEYOR BELT AND RELATED IMPROVEMENTS

BACKGROUND OF THE INVENTION

This invention relates generally to belt trippers for discharging particulate material, such as crushed coal, from the upper run of a moving conveyor belt and relates, more particularly, to the means by which belt trippers are moved along the length of a movable conveyor belt between two alternative locations and to the conveyor belt for use with such belt trippers.

Belt trippers of the class with which this invention is concerned includes an elongated frame having first and second ends between which the upper run of a conveyor belt is conveyed so that the belt is conveyed upon the elongated frame by way of the first end thereof and is conveyed off of the frame by way of the second end thereof. The belt tripper also includes a pair of rollers mounted adjacent the second end of the frame over which the belt is routed in sequence so that upon moving over the first roller, the belt is conveyed back beneath itself as it moves between the first and second rollers so that particulate material being carried by the belt is permitted to fall from the upper run of the belt after moving across the first roller. A chute associated with the belt tripper directs the particulate material which falls from the upper run of the belt to one side of the belt or to the other side of the belt where it is collected for storage or transport.

In order that the belt tripper be moved along the belt for purposes of discharging conveyed material from the upper run of the belt at selected locations therealong, there is commonly provided guideway-defining means, such as a pair of parallel guide rails, which extend along the length of the upper run of the belt, and the belt tripper includes a set of wheels which are rollably positioned upon the guideway-defining means for movement therealong. However, belt trippers of the prior art do not possess the capability of moving through a curved section of the guideway-defining means. Consequently, in order for a single belt tripper to be used to discharge conveyed material from an upper run of a belt at two locations therealong, the guideway-defining means must be provided with a straight section between the two locations. For example, in many parts of the country from which coal is commonly mined and conveyed along conveyor belts of this class, hills prevent the guideway-defining means from possessing straight sections of any appreciable length, thus limiting the positions along the length of a conveyor belt to which a belt tripper can be moved for purposes of discharging the particulate material from the belt at those positions. It would be desirable to provide a belt tripper with the capacity to be moved through a curve for discharging particulate material from a conveyor belt at alternative locations along the length of the belt and a belt for use with such a belt tripper.

Accordingly, it is an object of the present invention to provide a new and improved belt tripper system having a belt tripper capable of being moved along a curved section of a guideway and a belt capable of being used with such a belt tripper.

Another object of the present invention is to provide such a system which is well-suited for use in hilly country wherein the terrain typically prevents straight sections of track having substantial length.

Another object of the present invention is to provide such a system which is uncomplicated in construction and effective in operation.

SUMMARY OF THE INVENTION

The present invention resides in an improvement in a belt tripper system for discharging particulate material from the upper run of an endless conveyor belt wherein the belt is conveyed along the length of a conveyor support system. Elongated guiding means are provided which extend along the length of the conveyor support system, and the belt tripper system includes a frame rollably supported by the guiding means for movement along the length thereof. Furthermore, the belt tripper system includes first and second rollers across which the upper run of the belt is routed in sequence so that the belt is conveyed back beneath itself as it moves between the first and second rollers and so that particulate material is permitted to fall from the upper run of the belt after moving across the first roller.

In one aspect of the invention, the belt with which the belt tripper system is used is substantially comprised of an elastomeric material which permits the belt to flex laterally in the event that the guiding means includes a laterally-curved section along its length.

In another aspect of the invention, the improvement includes means associated with the frame of the belt tripper and cooperating with the guide rails in a manner enabling the belt tripper to be guided along a curved section of the guide rails while the upper run of the belt remains operatively routed across the first and second rollers of the belt tripper.

BRIEF DESCRIPTION OF THE DRAWINGS

FIG. 7 is a side elevational view, similar to that of FIG. 3, illustrating schematically an alternative belt tripper system.

DETAILED DESCRIPTION OF ILLUSTRATIVE EMBODIMENTS

Figure 1:
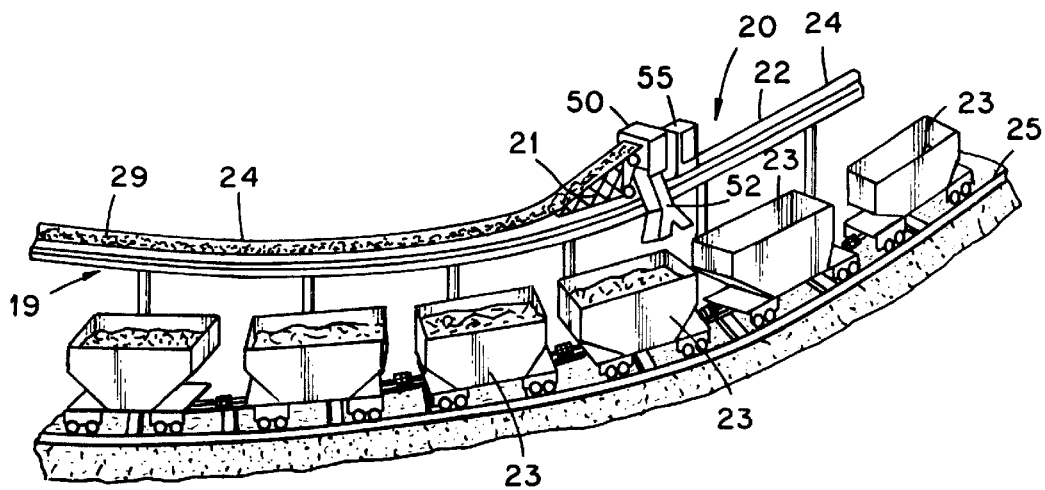
FIG. 1 is a perspective view of an exemplary environment within which a belt tripper system is utilized.

Turning now to the drawings in greater detail, there is illustrated in FIG. 1 an exemplary environment within which a belt tripper system, generally indicated 20, is utilized. The depicted environment is associated with a coal mining operation wherein particulate material 29 in the form of crushed coal is conveyed along a conveyor system 22 and is discharged from the conveyor system 22 by way of a belt tripper 21 for loading the coal into railway cars 23 parked or moving along a track 25 situated below the conveyor system 22. The conveyor system 22 includes an endless conveyor belt 24 and a plurality of conveyor support rollers 26 (FIGS. 3 and 6) which are rotatably supported along the length of the system 22 for movably supporting the belt 24 along its length.

Figure 2:
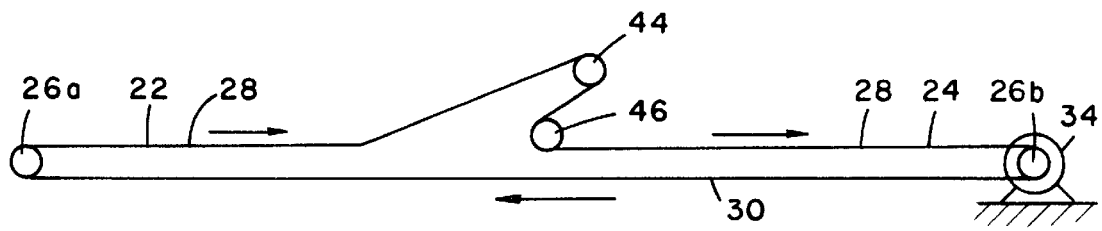
FIG. 2 is a side elevational view illustrating schematically an endless conveyor belt and the operative belt-tripping rollers of a belt tripper system.

With reference to FIG. 2, two rollers 26a and 26b are disposed at opposite, distal ends of the belt 24 for dividing the belt 24 into an upper run 28 and a lower, or return, run 30. Suitable motive means, such as a motor 34, is drivingly connected to the belt 24 by way of a drive roller (e.g. roller 26b) for moving the belt 24 along the rollers 26 so that the upper belt run 28 moves in one direction (or rightwardly as viewed in FIGS. 2 and 3) along the length of the conveyor system 22 and so that the lower belt run 30 moves in the opposite direction (or leftwardly as viewed in FIGS. 2 and 3) along the length of the conveyor system 22. Particulate material desired to be conveyed along the belt 24 can be deposited at a load point along the upper belt run 28 adjacent the end roller 26a and is carried by the upper belt run 28 to the belt tripper 21. The particulate material can be deposited upon the upper belt run by a feeding conveyor (not shown) or a wheeled loader. Both the belt tripper 21 and the conveyor system 22 are supported in an elevated condition above the railway tracks 25 by way of a steel super structure 54.

Figure 3:
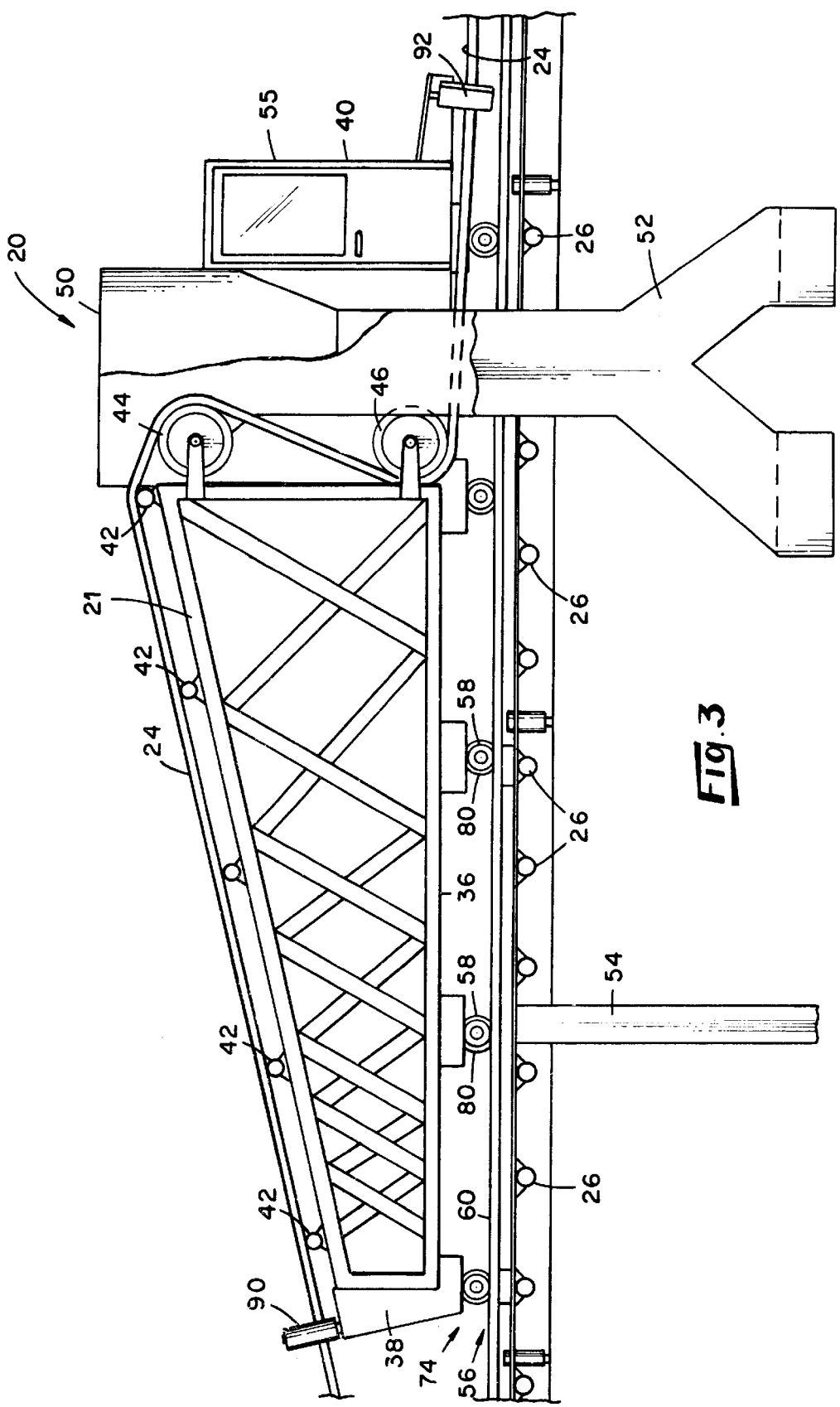
FIG. 3 is a side elevational view of a fragment of the FIG. 1 environment and the belt tripper system utilized therein.
Figure 4:
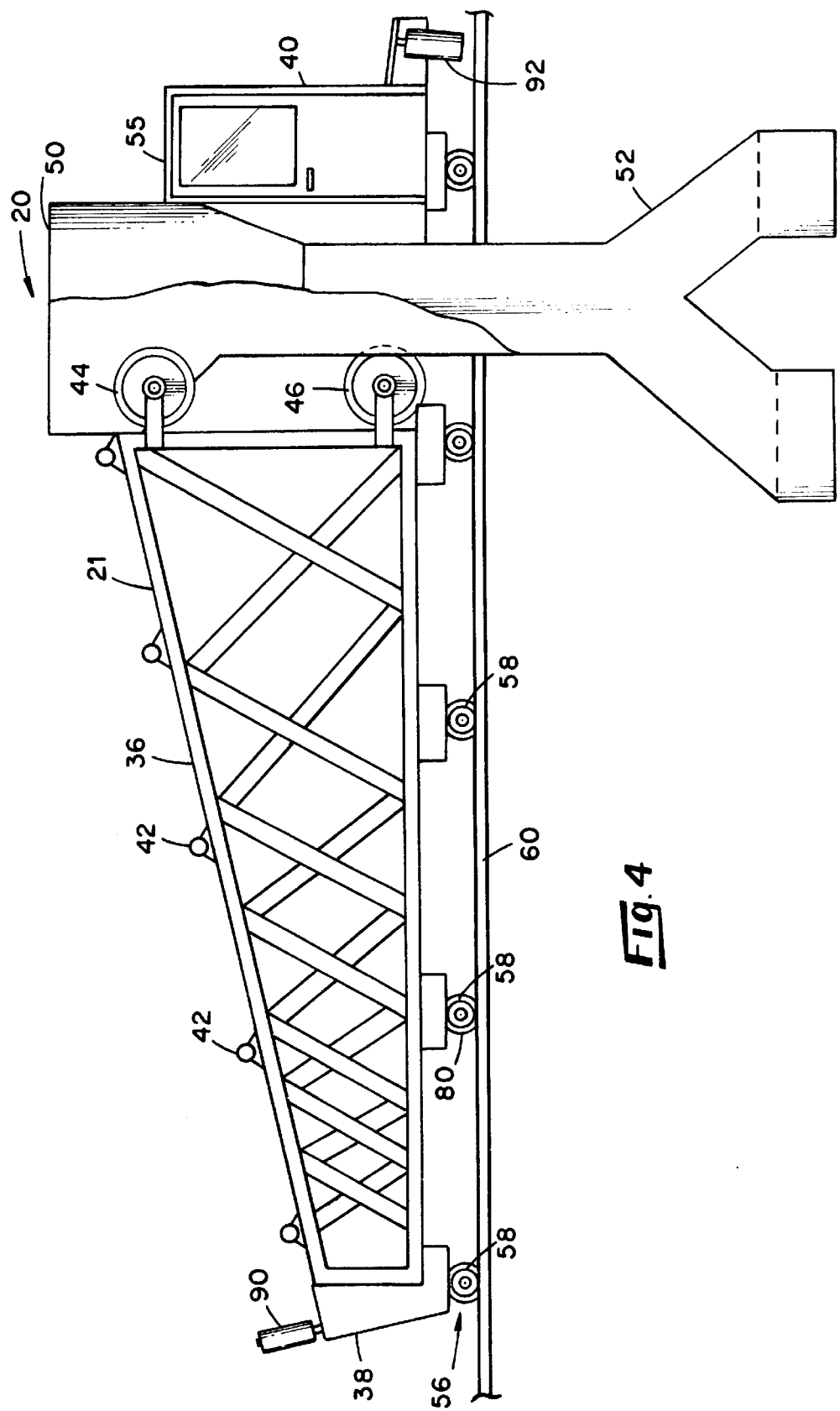
FIG. 4 is a side elevational view, similar to that of FIG. 1, showing the belt tripper of the FIG. 1 system without the conveyor belt being routed therethrough.

With reference to FIGS. 3 and 4, the belt tripper 21 includes an elongated frame 36 comprised, for example, of steel having a first end 38 and a second end 40 between which a segment of the upper belt run 28 is conveyed for purposes of discharging particulate material from the upper belt run 28 adjacent a desired location therealong. Rotatably supported by the frame 36 along the upper edges thereof are a plurality of conveyor support rollers 42 which underlie and support the segment of the upper belt run 28 which is conveyed between the first and second frame ends 38 and 40. As is apparent from the FIG. 3 view, the upper belt run 28 is carried from a first elevation to a second and higher elevation as the upper belt run 28 is moved along the frame 36.

The belt tripper 21 also includes a pair of first and second rollers 44 and 46, respectively, adjacent the second frame end 40 across which the upper belt run 28 is routed as the upper belt run 28 is returned to a lower elevation which corresponds generally with the aforementioned first elevation at which the upper belt run 28 is conveyed onto the first frame end 38. As best shown in FIGS. 2 and 3, the upper belt run 28 is routed back beneath itself as it is moved across the roller 44 so that particulate material which is carried by the upper belt run 28 is permitted to fall under the influence of gravity from the belt 28 as it is moved across the roller 44. In other words, the upper belt run 28 is routed about the periphery of the first roller 44 to create a precipice from which particulate material which is carried by the belt 24 is permitted to fall. It follows that the right-side-up orientation of the upper belt run 28 is re-oriented as it passes across the roller 44 to somewhat of a right-side-down orientation. Conversely, as the upper belt run 24 is routed about the periphery of the second roller 46, the orientation of the upper belt run 28 is again re-oriented to a right-side-up orientation.

A conventional collecting hopper 50 is supported by the frame 36 adjacent the second end 40 thereof to receive particulate material discharged from the upper belt run 28 at the roller 44. This collecting hopper 50 includes a chute 52 for directing the discharged material downwardly and to one side of the belt 24 (or to the other side of the belt 24) where it is gravitationally directed downwardly therethrough to the railway cars 23 (FIG. 1) parked below the chute 52. The depicted chute 52 is adapted to load multiple railroad cars simultaneously, and an alternative chute can be used to load railway cars parked along multiple tracks. Also associated with the belt tripper 21 is an operator platform 55 disposed adjacent the frame end 40.

The conveyor belt 24 is preferably a flexible trough-type of belting including elastomeric material which permits the belt 24 to be routed along a relatively tortious path (as is the case as it moves across the rollers 44 and 46) and to flex laterally as the belt 24 is moved through a curvature without experiencing belt damage. An example of such a flexible belt 24 is shown and described in U.S. Pat. No. 4,410,082. Another example of such a flexible belt is available from Krupp Industries, Inc. of Bridgeville, U.S.A. in connection with its trade designation "Contour Conveying". In the depicted environment, the belt 24 is supported by the aforementioned support rollers 26 (as the belt 24 is moved along the conveyor system 22) and by the aforementioned support rollers 42 (as the upper belt run 28 is conveyed between the ends 38, 40 of the belt tripper 21) which are shaped appropriately so that the cross-sectional shape of the upper belt run 28 is maintained relatively trough-like. This trough-like shape of the belt 24 enhances the material-holding capacity of the belt 24.

Figure 6:
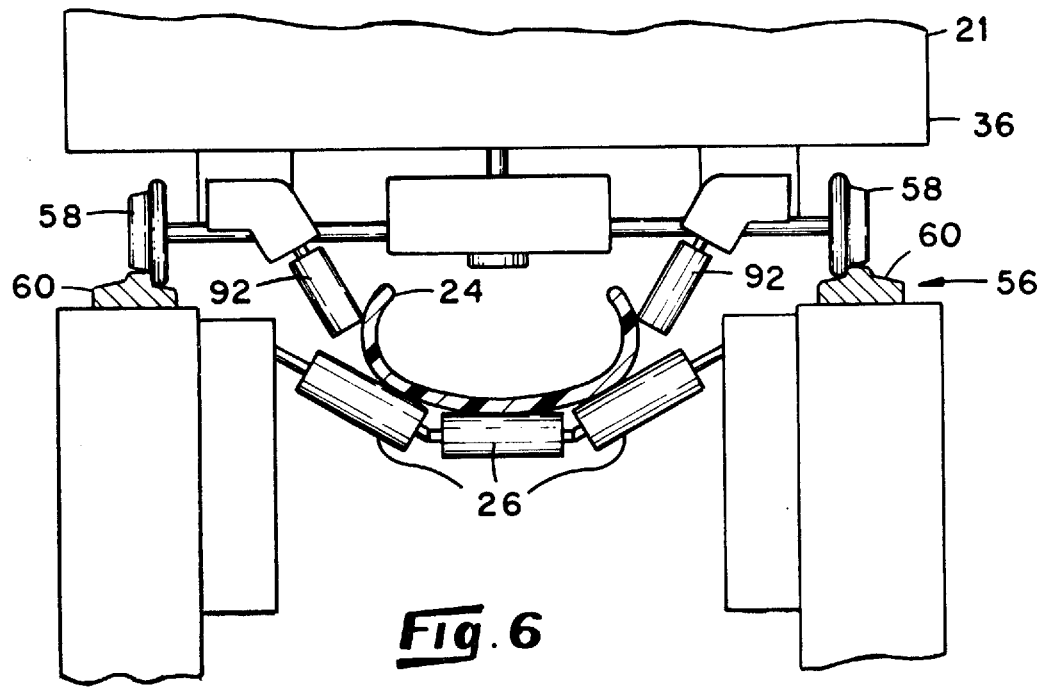
FIG. 6 is front elevational view of a fragment of the belt tripper system of FIG. 1 as seen generally from the right in FIG. 1.

To enable the belt tripper 21 to be moved along the length of the belt 24 for purposes of discharging the particulate material from the upper belt run 28 at alternative locations therealong, the system 20 is provided with guiding means, generally indicated 19, including guideway-providing means 56 and wheels 58 appropriately journalled to the frame 36 for rollably supporting the frame 36 for movement along the length of the guideway-providing means 56. In the depicted system 20, the guideway-providing means 56 includes a pair of parallel guide tracks 60 (comparable to train track rails) supported in an elevated condition by the super structure 54 so that the tracks 60 are disposed on opposite sides of the belt 24 (as best shown in FIG. 6), and the wheels 58 are comparable to those of a railway car adapted to remain in rolling engagement with the tracks 60 as the frame 36 is moved therealong.

In order to move the belt tripper 21 along the length of the guide tracks 60, suitable motive means, such as a cable puller (not shown), can be hooked to the frame 36 for pulling the belt tripper 21 between desired locations as the wheels 58 are guided along the tracks 60. It will be understood that as the belt tripper 21 is guided along the tracks 60, the upper run 28 of the belt 24 remains operatively routed about the first and second rollers 44 and 46 as aforedescribed.

It will be understood that the conveyor system 22 extends generally parallel to the railway tracks 25 as a path is traced along the length thereof in order that the conveyor system 22 extend alongside the railway cars parked along the tracks 25, and the guide tracks 60 are generally parallel to the belt 24 as a path is traced along the length thereof in order that the belt tripper 21 be maintained in registry with the belt 24. Accordingly, wherever the tracks 25 are curved along their length, the conveyor system 22 is curved as well, and wherever the conveyor system 22 is curved along its length, the guide tracks 60 are curved as well.

Figure 5:
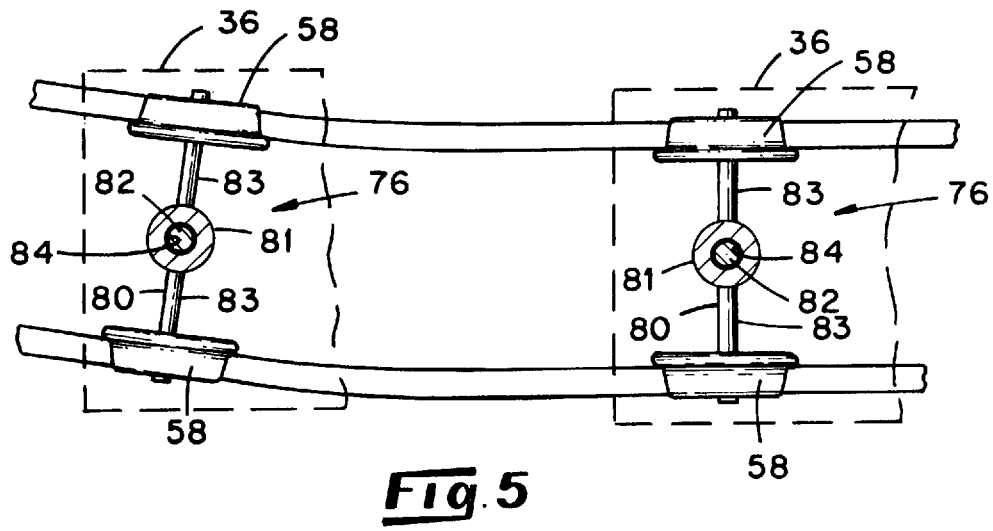
FIG. 5 is a fragmentary plan view of an exemplary wheel assembly of the belt tripper of FIG. 1.

It is a feature of the belt tripper system 20 that it includes means, generally indicated 74 in FIG. 3, which enable the belt tripper 21 to follow the tracks 60 through a curved section of the tracks 60. In the depicted embodiment 20, such enabling means 74 includes means, indicated 76, interposed between the wheels 58 and the frame 36 which enable the wheels 58 to adjust in position relative to the frame 36 so that the wheels 58 can follow the curvature of the track 60. In this connection and with reference to FIG. 5, the interposed means 76 includes an axle assembly 80 including a spindle 81 and two axle portions 83 joined to opposite sides of the spindle 81 and to which the wheels 58 are rotatably attached. The axle assembly 80 is pivotally connected to the frame 36 by way of a pivot pin 82 which is affixed to the frame 36 and which extends through an opening 84 provided in the spindle 81. Thus, the axle assembly 80 is permitted to pivot about the pivot pin 82 relative to the frame 36 to alter the position of the wheels 58 relative to the frame 36 so that as the belt tripper 21 is moved along the conveyor system 22 and the wheels 58 are guided along the length of the tracks 60, the wheels 58 are maintained in registry with the tracks 60.

As an alternative to the aforedescribed arrangement including the wheel 58 and axle assembly 80, caster-type wheels which are attached to the frame 36 in a manner which permits each caster-type wheel to pivot about a corresponding vertical axis so that each wheel is maintained in registry with the underlying track. In this instance, each wheel is permitted to alter its position relative to the corresponding frame of the belt tripper independent of the other wheels.

With reference again to FIG. 3 and for purposes of maintaining the belt 24 in substantial alignment with the support rollers 42 of the belt tripper 21 as the belt tripper 21 is moved through or parked upon a curve, the system 20 is provided with sets of guide rollers 90 or 92 at each end of the frame 36. In particular, one set of rollers 90 are mounted on opposite sides of the belt 24 adjacent the frame end 38 for rotation about an axis which is slightly offset from the vertical. The periphery of each roller 90 engages a corresponding side of the upper belt run 28 so that as the upper belt run 28 travels onto the frame end 38, the rollers 90 help to maintain a lateral flex within the upper belt run 28 and help to maintain the upper belt run 28 in registry with support rollers (26 or 42) situated upstream as well as downstream of the guide rollers 90. Therefore, as the belt tripper 21 is moved through a curve which effects a lateral flexing of the belt 24 as it maneuvers the curve, the upper belt run 28 is maintained in contact with the rollers 90 on opposite sides thereof and guided through (a portion of) the curve by the rollers 90. It will be understood that the rollers 90 situated on the inside of a curve are the ones which are most helpful during the maneuvering of the belt run 28 through the curve. Accordingly, in a situation in which an upper belt run 28 curves in only one direction (i.e. either rightwardly or leftwardly) along its length, guide rollers 90 may be disposed only along the inside of the curve of the upper belt run 28.

On the opposite end 40 of the frame 36 and with reference to both FIGS. 3 and 6, the rollers 92 are mounted on opposite sides of the upper belt run 28 for rotation about an axis which is slightly offset from the vertical. The periphery of each roller 92 engages a corresponding side of the upper belt run 28 so that as the upper belt run 28 travels off of the frame end 40, the rollers 92 help to maintain a lateral flex within the upper belt run 28 and help to maintain the upper belt run 28 in registry with support rollers situated upstream as well as downstream of the guide rollers 92. Therefore, as the belt tripper 21 is moved through a curve which effects a lateral flexing of the belt 24 as it maneuvers the curve, the upper belt run 28 is maintained in contact with the rollers 92 on opposite sides thereof and guided through (a portion of) the curve by the rollers 92.

As is best shown in FIG. 3, the frame 36 of the depicted belt tripper 21 is of substantial length between its ends but is well-suited for movement along a curve of relatively large radius. However, if desired, the frame of a belt tripper in accordance with the broader aspects of the present invention may be segmented to accommodate its movement through curves of much smaller radius. For example, there is shown in FIG. 7 an alternative embodiment of a belt tripper 100 including a frame 101 comprised of a plurality of hinged segments 102, 104 which are joined together by means of a clevis arrangement 106 and a pivot pin 108 which permit the segments 102, 104 to pivot laterally with respect to one another about a vertical axis of pivot. Each segment 102 or 104 is suitably supported upon the tracks 60 by two sets of wheels 58 and is provided with guide rollers 90, 92 at the end of each frame segment 102 or 104 which help to maintain the upper belt run 28 in registry with the support rollers (26 or 42) situated upstream and downstream of the guide rollers 90 or 92.

It will be understood that numerous modifications and substitutions can be had to the aforedescribed embodiment without departing from the spirit of the invention. For example, although the aforedescribed segmented frame 101 of the belt tripper 100 or FIG. 7 has been shown and described as including two segments 102, 104 which are joined together with a pivot pin 108, a belt tripper frame may include an alternative number of segments (e.g. three or more) which are hingedly joined together to accommodate a lateral flexing of the frame between its ends.

Figure 8:
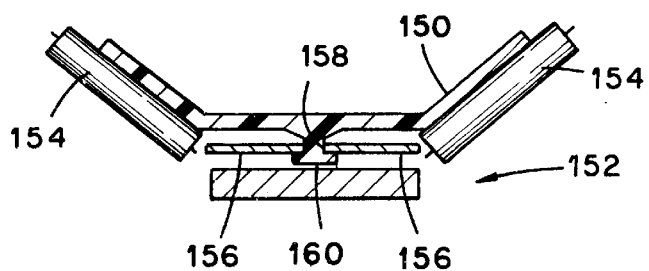
FIG. 8 is a cross-sectional view illustrating schematically a belt and belt-guiding arrangement for an alternative embodiment of the present invention.

Still further, although the aforedescribed belt 24 has been shown as including a relatively smooth underside for movement along the rollers 26 and 42, alternative belt-guiding means may include a guide track and an alternative belt may include a guide track follower which guides the movement longitudinally along the rails. For example there is illustrated in FIG. 8 an elastomeric track-type belt 150 supported for movement along guiding means 152 including conveyor rollers 154 on each side thereof and a pair of rotatable wheels 156 supported between the rollers 154. In this FIG. 8 embodiment, the guide track is provided by the spacing 158 provided between the periphery of the wheels 156 and the guide track follower is provided by a longitudinal, integrally-formed rib 160 which extends along the length of the belt 150 on the underside thereof.

As the belt 150 is moved longitudinally, its lateral movement is constrained by the spacing 158 provided between the wheels 156. Accordingly, as the spacing 158 is curved in accordance with the desired path of the upper belt run, the cooperation between the rib 160 and the spacing 158 guides the rib 160 and belt 150 along the curve as the belt 150 flexes laterally therealong. In some applications, it may be desired that the belt 150 be forcibly moved along its desired path by the forced rotation of the wheels 156 and the frictional gripping engagement between the wheels 156 and the rib 160. Track-type belts of the aforedescribed class are available from Lewin Fordertechnologie GmbH of Germany. Alternative belts of the aforedescribed class may include a plurality of ribs for movement along a multiple of guide tracks.

Yet still further, although the aforedescribed belt tripper system 20 has been shown as being right-handed in construction (in that it is adapted for use with an upper belt run 28 moving rightwardly as shown in FIG. 1), a belt tripper system may be constructed for use in a left-handed environment, i.e. for use with an upper belt run which is advanced leftwardly as viewed in FIG. 1.

Accordingly, the aforedescribed embodiments are intended for the purpose of illustration and not as limitation.

I claim:

1. In a belt tripper system for discharging particulate material from the upper run of an endless conveyor belt wherein the belt is conveyed along the length of a conveyor support system, and elongated guiding means are provided which extend along the length of the conveyor support system, and the belt tripper system includes a belt tripper including a frame which cooperates with the guiding means for movement along the length thereof and first and second rollers across which the upper run of the belt is routed in sequence so that the belt is conveyed back beneath itself as it moves between the first and second rollers so that particulate material is permitted to fall from the upper run of the belt after moving across the first roller, the improvement characterized in that:

the belt is substantially comprised of an elastomeric material which permits the belt to flex laterally in the event that the guiding means includes a laterally-curved section along its length.

2. In a belt tripper system for discharging particulate material from the upper run of an endless conveyor belt wherein the belt is conveyed along the length of a conveyor support system, and elongated guiding means are provided which extend along the length of the conveyor support system, and the belt tripper system includes a belt tripper including a frame which cooperates with the guiding means for movement along the length thereof and first and second rollers across which the upper run of the belt is routed in sequence so that the belt is conveyed back beneath itself as it moves between the first and second rollers so that particulate material is permitted to fall from the upper run of the belt after moving across the first roller, the improvement characterized in that:

each of the guiding means and the belt tripper system includes means providing a guide track and the belt is substantially comprised of an elastomeric material and includes means providing a guide track follower which cooperates with the guide track so that the longitudinal movement of the belt is guided by the guiding means and the belt tripper system.

3. The improvement as defined in claim 2 wherein the guide track follower of the belt includes at least one rib which extends therealong and which is slidably received by the guide track of the guide track-providing means so that the longitudinal movement of the belt is guided by the cooperation between the rib and the guide track.

4. The improvement as defined in claim 3 wherein the belt is adapted to flex laterally in the event that the guide track of the guide track-providing means includes a laterally-curved section along its length and the belt is guided through the laterally-curved section of the guide track.

5. In a belt tripper system for discharging particulate material from the upper run of an endless conveyor belt wherein the belt is conveyed along the length of a conveyor support system, and elongated guiding means are provided which extend along the length of the conveyor support system, and the belt tripper system includes a belt tripper including a frame which cooperates with the guiding means for movement along the length thereof and first and second rollers across which the upper run of the belt is routed in sequence so that the belt is conveyed back beneath itself as it moves between the first and second rollers so that particulate material is permitted to fall from the upper run of the belt after moving across the first roller, the improvement comprising:

means associated with the frame of the belt tripper and cooperating with the guiding means in a manner enabling the belt tripper to be guided along a curved section of the guiding means while the upper run of the belt remains operatively routed across the first and second rollers of the belt tripper.

6. The improvement as defined in claim 5 wherein the belt tripper frame includes a plurality of segments which are hingedly connected to one another to accommodate a pivoting of each frame segment relative to its adjacent frame segment about a vertical axis of pivot and thereby enable the frame to be guided along the curved section of the guiding means as aforesaid.

7. The improvement as defined in claim 5 wherein the guiding means includes a pair of parallel guide rails, and the frame is rollably supported by the guide rails for movement along the length thereof, and the belt tripper system includes a plurality of wheels attached to the frame for rollably supporting the frame upon the guide rails and means associated with the wheels which permit the wheels to adjust in position relative to the frame as the belt tripper system is moved along a curved section of the guide rails.

8. The improvement as defined in claim 7 wherein the plurality of wheels include a pair of wheels, and the associated means includes an axle assembly to which the pair of wheels are rotatably joined, and means for pivotally securing the axle assembly to the frame so that as the belt tripper system is guided along a curved section of the guide rails, the pair of wheels is permitted to pivot relative to the frame as aforesaid to remain in rolling engagement with the guide rails.

9. The improvement as defined in claim 5 further comprising at least one guide roller rollably supported by the frame and disposed to one side of the upper belt run for maintaining a lateral flex within the upper belt run as the belt tripper is moved through a curved section of the guiding means.

10. The improvement as defined in claim 5 further comprising a pair of guide rollers rollably supported by the frame and disposed on opposite sides of the upper belt run for maintaining a lateral flex within the upper belt run as the belt tripper is moved through a curved section of the guiding means.

11. The improvement as defined in claim 5 wherein the frame of the belt tripper is elongated in shape with first and second ends between which the upper belt run moves as the belt is conveyed toward the first roller, and the belt tripper includes a pair of guide rollers rollably supported on opposite sides of the belt and disposed adjacent one of the first and second ends of the frame for maintaining a lateral flex within the upper belt run as the belt tripper is moved laterally through a curved section of the guiding means.

12. The improvement as defined in claim 11 wherein said pair of guide rollers is a first pair of guide rollers and the belt tripper further includes a second pair of guide rollers rollably supported by the frame and disposed on opposite sides of the upper belt run for maintaining a lateral flex within the upper belt run as the belt tripper is moved laterally through a curved section of the guiding means and wherein the second pair of guide rollers is disposed adjacent the other of the first and second ends of the frame.

13. The improvement as defined in claim 5 wherein each of the guiding means and the belt tripper system includes means providing a guide track and the belt is substantially comprised of an elastomeric material and includes means providing a guide track follower which cooperates with the guide track so that the longitudinal movement of the belt is guided by the guiding means of the belt tripper system.

14. The improvement as defined in claim 13 wherein the belt tripper frame includes a plurality of segments which are hingedly connected to one another to accommodate a pivoting of each frame segment relative to its adjacent frame segment about a vertical axis of pivot and thereby enable the frame to be guided along the curved section of the guiding means as aforesaid.

15. The improvement as defined in claim 13 wherein the guiding means includes a pair of parallel guide rails, and the frame is rollably supported by the guide rails for movement along the length thereof, and the belt tripper system includes a plurality of wheels attached to the frame for rollably supporting the frame upon the guide rails and means associated with the wheels which permit the wheels to adjust in position relative to the frame as the belt tripper system is moved along a curved section of the guide rails.

16. The improvement as defined in claim 15 wherein the plurality of wheels include a pair of wheels, and the associated means includes an axle assembly to which the pair of wheels are rotatably joined, and means for pivotally securing the axle assembly to the frame so that as the belt tripper system is guided along a curved section of the guide rails, the pair of wheels is permitted to pivot relative to the frame as aforesaid to remain in rolling engagement with the guide rails.

17. In combination with a curved section of a railway car track and a endless conveyor belt including an upper belt run which extends along the railway car track for conveying particulate material to a railway car situated on the railway car track:
a belt tripper for discharging particulate material from the upper run of the endless conveyor belt;
elongated guiding means for supporting the belt tripper along the length of the conveyor belt and along the curved section of the railway car track, and the belt tripper includes a frame movably supported by the guiding means for movement along the length thereof and first and second rollers across which the upper run of the belt is routed in sequence so that the belt is conveyed back beneath itself as it moves between the first and second rollers so that particulate material is permitted to fall from the upper run of the belt after moving across the first roller; and
means associated with the frame of the belt tripper and cooperating with the guiding means in a manner enabling the belt tripper to be guided along a curved section of the guiding means while the upper run of the belt remains operatively routed across the first and second rollers of the belt tripper.

18. The combination as defined in claim 17 wherein the belt tripper frame includes a plurality of segments which are hingedly connected to one another to accommodate a pivoting of each frame segment relative to its adjacent frame segment about a vertical axis of pivot and thereby enable the frame to be guided along the curved section of the guiding means as aforesaid.

19. The combination as defined in claim 17 wherein the guiding means includes a pair of parallel guide rails, and the frame is rollably supported by the guide rails for movement along the length thereof, and the belt tripper system includes a plurality of wheels attached to the frame for rollably supporting the frame upon the guide rails and means associated with the wheels which permit the wheels to adjust in position relative to the frame as the belt tripper system is moved along a curved section of the guide rails.

20. The combination as defined in claim 19 wherein the plurality of wheels include a pair of wheels, and the associated means includes an axle assembly to which the pair of wheels are rotatably joined, and means for pivotally securing the axle assembly to the frame so that as the belt tripper system is guided along a curved section of the guide rails, the pair of wheels is permitted to pivot relative to the frame as aforesaid to remain in rolling engagement with the guide rails.

21. The combination as defined in claim 17 further comprising at least one guide roller rollably supported by the frame and disposed to one side of the upper belt run for maintaining a lateral flex within the upper belt run as the belt tripper is moved through a curved section of the guiding means.

22. The combination as defined in claim 17 further comprising a pair of guide rollers rollably supported by the frame and disposed on opposite sides of the upper belt run for maintaining a lateral flex within the upper belt run as the belt tripper is moved through a curved section of the guiding means.

23. The combination of claim 17 wherein the frame of the belt tripper is elongated in shape with first and second ends between which the upper belt run moves as the belt is conveyed toward the first roller, and the belt tripper includes a pair of guide rollers rollably supported on opposite sides of the belt and disposed adjacent one of the first and second ends of the frame for maintaining a lateral flex within the upper belt run as the belt tripper is moved laterally through a curved section of the guiding means.

24. The combination of claim 23 wherein said pair of guide rollers is a first pair of guide rollers and the belt tripper further includes a second pair of guide rollers rollably supported by the frame and disposed on opposite sides of the upper belt run for maintaining a lateral flex within the upper belt run as the belt tripper is moved laterally through a curved section of the guiding means and wherein the second pair of guide rollers is disposed adjacent the other of the first and second ends of the frame.

25. The combination as defined in claim 17 wherein each of the guiding means and the belt tripper system includes means providing a guide track and the belt is substantially comprised of an elastomeric material and includes means providing a guide track follower which cooperates with the guide track so that the longitudinal movement of the belt is guided by the guiding means of the belt tripper system.

26. The combination as defined in claim 25 wherein the belt tripper frame includes a plurality of segments which are hingedly connected to one another to accommodate a pivoting of each frame segment relative to its adjacent frame segment about a vertical axis of pivot and thereby enable the frame to be guided along the curved section of the guiding means as aforesaid.

27. The combination as defined in claim 25 wherein the guiding means includes a pair of parallel guide rails, and the frame is rollably supported by the guide rails for movement along the length thereof, and the belt tripper system includes a plurality of wheels attached to the frame for rollably supporting the frame upon the guide rails and means associated with the wheels which permit the wheels to adjust in position relative to the frame as the belt tripper system is moved along a curved section of the guide rails.

28. The combination as defined in claim 27 wherein the plurality of wheels include a pair of wheels, and the associated means includes an axle assembly to which the pair of wheels are rotatably joined, and means for pivotally securing the axle assembly to the frame so that as the belt tripper system is guided along a curved section of the guide rails, the pair of wheels is permitted to pivot relative to the frame as aforesaid to remain in rolling engagement with the guide rails.

29. In a coal-processing environment involving a curved section of a railway car track and a endless conveyor belt including an upper belt run which extends along the railway car track for conveying particulate material to a railway car situated on the railway car track, the combination of:

a belt tripper for discharging particulate material from the upper run of the endless conveyor belt;

elongated guiding means mounted adjacent the railway car track and in an elevated condition with respect thereto for supporting the belt tripper along the length of the conveyor belt and along the curved section of the railway car track, and the belt tripper includes a frame movably supported by the guiding means for movement along the length thereof and first and second rollers across which the upper run of the belt is routed in sequence so that the belt is conveyed back beneath itself as it moves between the first and second rollers so that particulate material is permitted to fall from the upper run of the belt after moving across the first roller; and the belt tripper includes means associated with the frame of the belt tripper and cooperating with the guiding means in a manner enabling the belt tripper to be guided along a curved section of the guiding means while the upper run of the belt remains operatively routed across the first and second rollers of the belt tripper; and the belt is substantially comprised of an elastomeric material which permits the belt to flex laterally in the event that the guiding means includes a laterally-curved section along its length.

30. The combination as defined in claim 29 wherein the belt tripper frame includes a plurality of segments which are hingedly connected to one another to accommodate a pivoting of each frame segment relative to its adjacent frame segment about a vertical axis of pivot and thereby enable the frame to be guided along the curved section of the guiding means as aforesaid.

31. The combination as defined in claim 29 wherein the guiding means includes a pair of parallel guide rails, and the frame is rollably supported by the guide rails for movement along the length thereof, and the belt tripper system includes a plurality of wheels attached to the frame for rollably supporting the frame upon the guide rails and means associated with the wheels which permit the wheels to adjust in position relative to the frame as the belt tripper system is moved along a curved section of the guide rails.

32. The combination as defined in claim 31 wherein the plurality of wheels include a pair of wheels, and the associated means includes an axle assembly to which the pair of wheels are rotatably joined, and means for pivotally securing the axle assembly to the frame so that as the belt tripper system is guided along a curved section of the guide rails, the pair of wheels is permitted to pivot relative to the frame as aforesaid to remain in rolling engagement with the guide rails.

33. The combination as defined in claim 29 further comprising at least one guide roller rollably supported by the frame and disposed to one side of the upper belt run for maintaining a lateral flex within the upper belt run as the belt tripper is moved through a curved section of the guiding means.

34. The combination as defined in claim 29 further comprising a pair of guide rollers rollably supported by the frame and disposed on opposite sides of the upper belt run for maintaining a lateral flex within the upper belt run as the belt tripper is moved through a curved section of the guiding means.

35. The combination as defined in claim 29 wherein the frame of the belt tripper is elongated in shape with first and second ends between which the upper belt run moves as the belt is conveyed toward the first roller, and the belt tripper includes a pair of guide rollers rollably supported on opposite sides of the belt and disposed adjacent one of the first and second ends of the frame for maintaining a lateral flex within the upper belt run as the belt tripper is moved laterally through a curved section of the guiding means.

36. The combination as defined in claim 35 wherein said pair of guide rollers is a first pair of guide rollers and the belt tripper further includes a second pair of guide rollers rollably supported by the frame and disposed on opposite sides of the upper belt run for maintaining a lateral flex within the upper belt run as the belt tripper is moved laterally through a curved section of the guiding means and wherein the second pair of guide rollers is disposed adjacent the other of the first and second ends of the frame.

37. The combination as defined in claim 29 wherein each of the guiding means and the belt tripper system includes means providing a guide track and the belt is substantially comprised of an elastomeric material and includes means providing a guide track follower which cooperates with the guide track so that the longitudinal movement of the belt is guided by the guiding means of the belt tripper system.

38. The combination as defined in claim 37 wherein the belt tripper frame includes a plurality of segments which are hingedly connected to one another to accommodate a pivoting of each frame segment relative to its adjacent frame segment about a vertical axis of pivot and thereby enable the frame to be guided along the curved section of the guiding means as aforesaid.

39. The combination as defined in claim 37 wherein the guiding means includes a pair of parallel guide rails, and the frame is rollably supported by the guide rails for movement along the length thereof, and the belt tripper system includes a plurality of wheels attached to the frame for rollably supporting the frame upon the guide rails and means associated with the wheels which permit the wheels to adjust in position relative to the frame as the belt tripper system is moved along a curved section of the guide rails.

40. The combination as defined in claim 39 wherein the plurality of wheels include a pair of wheels, and the associated means includes an axle assembly to which the pair of wheels are rotatably joined, and means for pivotally securing the axle assembly to the frame so that as the belt tripper system is guided along a curved section of the guide rails, the pair of wheels is permitted to pivot relative to the frame as aforesaid to remain in rolling engagement with the guide rails.

* * * * *